United States Patent
Morgenstern et al.

(10) Patent No.: US 8,452,811 B2
(45) Date of Patent: *May 28, 2013

(54) METHOD AND APPARATUS FOR CONSTRUCTING A NETWORKING DATABASE AND SYSTEM PROACTIVELY

(75) Inventors: Jared Morgenstern, Aliso Viejo, CA (US); Edward Lim, Aliso Viejo, CA (US)

(73) Assignee: Buy.com, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,730

(22) Filed: Sep. 30, 2011

(65) Prior Publication Data

US 2012/0023563 A1    Jan. 26, 2012

Related U.S. Application Data

(63) Continuation of application No. 11/044,544, filed on Jan. 26, 2005, now Pat. No. 8,032,555, which is a continuation-in-part of application No. 10/997,121, filed on Nov. 24, 2004.

(60) Provisional application No. 60/481,955, filed on Jan. 26, 2004, provisional application No. 60/525,905, filed on Nov. 26, 2003.

(51) Int. Cl.
G06F 7/00    (2006.01)
G06F 17/30    (2006.01)

(52) U.S. Cl.
USPC .......................................................... 707/783

(58) Field of Classification Search
None
See application file for complete search history.

(56) References Cited

U.S. PATENT DOCUMENTS

2004/0093246 A1*    5/2004    Holland et al. ................... 705/7

* cited by examiner

*Primary Examiner* — Michael Hicks
(74) *Attorney, Agent, or Firm* — Mitchell P. Brook; McKenna Long & Aldridge LLP

(57) ABSTRACT

A method for creating networking database containing a plurality of records for different individuals in which individuals are connected to one another in the database by mutual recognition of a relationship. This mutual recognition of a relationship is inferred by the possession of the Guest Key of one member by the other member. This paradigm for network expansion allows users to proactively grow their networks both using the site features and using tools they may be more familiar with, such as email, messaging, talking, etc.

17 Claims, 8 Drawing Sheets

METHOD AND APPARATUS FOR CONSTRUCTING A NETWORKING DATABASE AND SYSTEM PROACTIVELY

CROSS REFERENCE TO RELATED APPLICATIONS

Priority is claimed to U.S. patent application Ser. No. 11/044,544, filed Jan. 26, 2005, which has priority to and to U.S. Provisional Patent Application Ser. No. 60/481,955, filed Jan. 26, 2004 and is a continuation-in-part of U.S. patent application Ser. No. 10/997,121, filed Nov. 24, 2004, which has priority to Provisional Application Ser. No. 60/525,905, filed Nov. 26, 2003, all of which are incorporated herein by reference, including without limitation text, figures and program listings.

BACKGROUND OF THE INVENTION

1. Field of the Invention

The present invention relates to a system and method of enabling software interactions including a computer-implemented method and system.

2. Description of the Related Art

The foundational patent received for this field of invention is U.S. Pat. No. 6,175,831, entitled Method And Apparatus For Constructing A Networking Database And System. This is understood to be the method SixDegrees.com used to build its social networking database. It asked a user to specify a relationship between themselves and another person. It then asked the other person to confirm this relationship. In this manner, relationships were offered and then either confirmed or denied. Many social networking sites are understood to have used this method. Friendster is an example. Friendster requires the following interactions to create a mutual relationship between two people: 1) a user locates another member and asks for friendship 2) the other member receives communication 3) the other member either receives or denies the confirmation of the relationship. If they confirm the relationship, the users are stored as mutual friends within the database.

The invention described here attempts to provide a more rapid procedure for people to extend their network. Consider the following scenario: John uploads a photo gallery to a website that uses social software, but he only has one friend on the site and most of his friends are not members of the site. In the traditional model, if he wants his friends to see his gallery they first have to become members, and then one party has to initiate a friend request. After that has been done, the other party must confirm. At this point John can point them to the photo gallery.

Many social networking sites do employ a process where an individual can invite people to their network, and upon join they will be made friends, but this typically requires the individual to invite the user from within the system.

Accordingly, there is a need for a system and method of creating a networking database and system proactively.

SUMMARY OF THE INVENTION

The present invention alleviates to a great extent the disadvantages of the known advertising systems by providing an automated mechanism where brand owners can tap into a network of individuals or groups who are willing to represent their brands via their identities as part of a community.

A system of facilitating growth of an affinity network outside an environment of a social networking tool is provided. A guest key system is provided in which a user (whether an individual or company) can become a friend and view another user's content, thereby proactively recruiting friends to join the user's network. A user can expand the user's network by sharing his or her guest key with individuals that he wants to join his network and access his content. This may be done within a social networking system or outside of the social networking system. In accordance with an embodiment of the present invention, a member of a social networking system can grow a network of friends independent of a particular service provider.

BRIEF DESCRIPTION OF THE DRAWINGS

These and other features of the invention, its nature, and various advantages will be appreciated more apparent from the accompanying drawings, and the following detailed description in which like reference numbers represent like parts throughout.

DETAILED DESCRIPTION OF THE INVENTION

In the following paragraphs, the present invention will be described in detail by way of example with reference to the accompanying drawings. Throughout this description, the preferred embodiments and examples shown should be considered as exemplars, rather than as limitations on the present invention. It will be apparent that the invention can be embodied in a wide variety of forms, some of which may be quite different from those of the disclosed embodiments. Consequently, the specific structural and functional details disclosed herein are merely representative and do not limit the scope of the invention. As used herein, the "present invention" refers to any one of the embodiments of the invention described herein, and any equivalents. Furthermore, reference to various aspects of the invention throughout this document does not mean that all claimed embodiments or methods must include the referenced aspects.

A method of constructing a networking database proactively, where, under control of a server system, access to user content is restricted unless the viewer (of the user content) is a member of a group approved for content viewing, or the viewer has submitted a guest key that is associated with the user content—the guest key being pre-selected by the user. Where a guest key is provided, the correct submission of a guest key triggers a reciprocal friend relationship to be stored in a storage device for both the user and the viewer. A preferred embodiment of this invention has the user selecting his/her guest key at sign-up and having the ability to modify this key if it becomes compromised. In a preferred implementation the user is allowed to monitor how rapidly their network is expanding using their guest key and other people's guest keys. For the full utilization of the invention, a system allows a user to deliver a link to a person with the guest key embedded in the link, so that when the link is clicked, the person becomes associated as a friend. The service provider can also provide this link for the user, as a convenience. A preferred embodiment allows people who are not yet members to click on this link, see a preview of the content that the person has waiting for them, join, and then be redirected to the content, where they will also be made friends with the user, i.e. associated with the user as within an associational group of the user.

Figure 1:
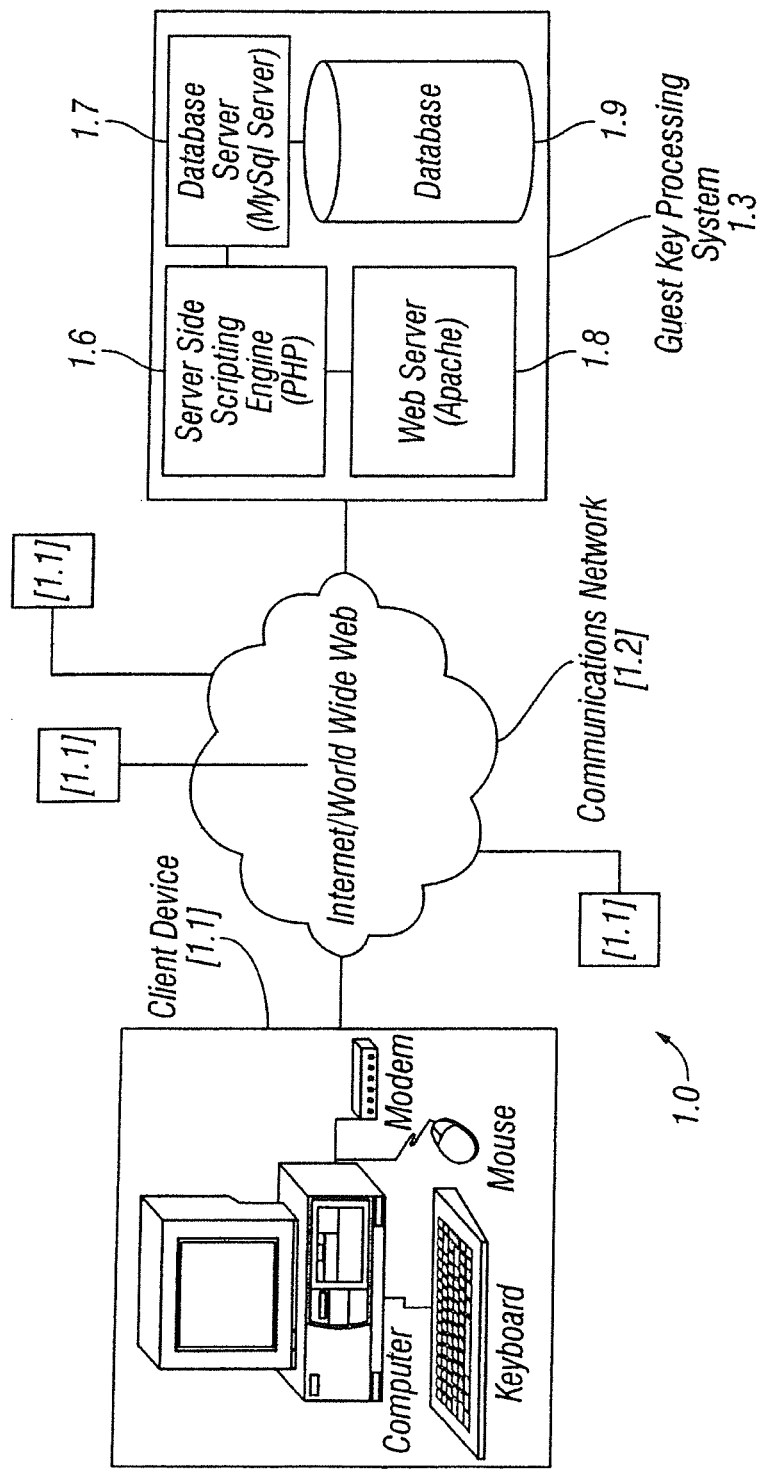
FIG. 1 is a block diagram of a system of constructing a networking database proactively (referred to as a "Guest Key system" herein) in accordance with a preferred embodiment of the present invention.

Referring to FIG. 1, there is generally shown a system of proactively building an associational network via a communications network in accordance with the present invention (GUEST KEY system 1.0). The GUEST KEY system 1.0 includes a plurality of client devices 1.1 (such as may be accessed by the "users" or "viewers" discussed herein), each of which is coupled to a network 1.2, and, in turn, to a GUEST KEY server system (GKSS) 1.3. Each client device 1.1, of which one is shown in some detail and three others are represented in block form, is typically a personal computer, such as a Windows-based personal computer. It should be understood that client devices may also be laptops, PDA's, workstations, mobile phones, Internet enabled TV, etc. Each client device 1.1 preferably has an input device such as a keyboard and/or mouse and a display for communication with a user. The client device 1.1 has communications software and a modem (or some other form of Internet connectivity, such as a DSL modem, cable modem, T-1 line, ISDN line, etc). Communications software may be any software suitable for telecommunications, and is preferably browser software. The communications software is for communication over network 1.2 with a GKSS 1.3. Network 1.2 may be, for example, the Internet.

The GKSS 1.3 is preferably a web application that displays contents authored by agents, where agents are individuals or groups. The GKSS 1.3 may be a wholly integrated web application such as a web log and social networking web site that allows users to decorate themselves with brands and that shares the same web server 1.8, database provider, and server side scripts. It should also be understood that the GKSS 1.3 may be utilized by third party web applications. Examples of third party web applications include Blogger, social networking systems such as Friendster, instant messaging systems such as AOL Instant Messenger, and community oriented applications such as Ebay and oPhoto, provided these services are modified to interface with the GKSS 1.3.

The GKSS 1.3 typically includes, for example, a web server, which is characteristically a programmed computer, preferably one which supports a HyperText Transfer Protocol (HTTP), that handles document requests and provides other services, returning information to the requestor. It should be understood that the web server may communicate by exposing web services which communicate XML, etc. It should be clear that the web server could be replaced by an application that functions as a server, such as a program that listens to a specific port for incoming request. Many suitable software programs for the web server exist, including Apache and Microsoft Internet Information Services (IIS). GKSS 1.3, in addition to a web server, includes a server side scripting engine 1.6, preferably PHP, available from php.net, connected to the web server for pre-processing an output from the web server before it is returned via the communications network. The server side scripting engine 1.6 also allows communication with a database server 1.7, preferably Mysql, available from mysql.com, using the Open Database Connectivity (ODBC) protocol. Other similar server side scripting products could be used, such as Cold Fusion, ASP.NET technology. The database server 1.7 is generally configured as an SQL database, and, besides Mysql, other database systems could be used such as those available from Oracle, Informix, Microsoft, or Sybase. The GKSS 1.3 may also be a multi-server system, such as a web farm. The database server 1.7 is in communication with a database 1.9 in which the database server 1.7 stores content.

Figure 2:
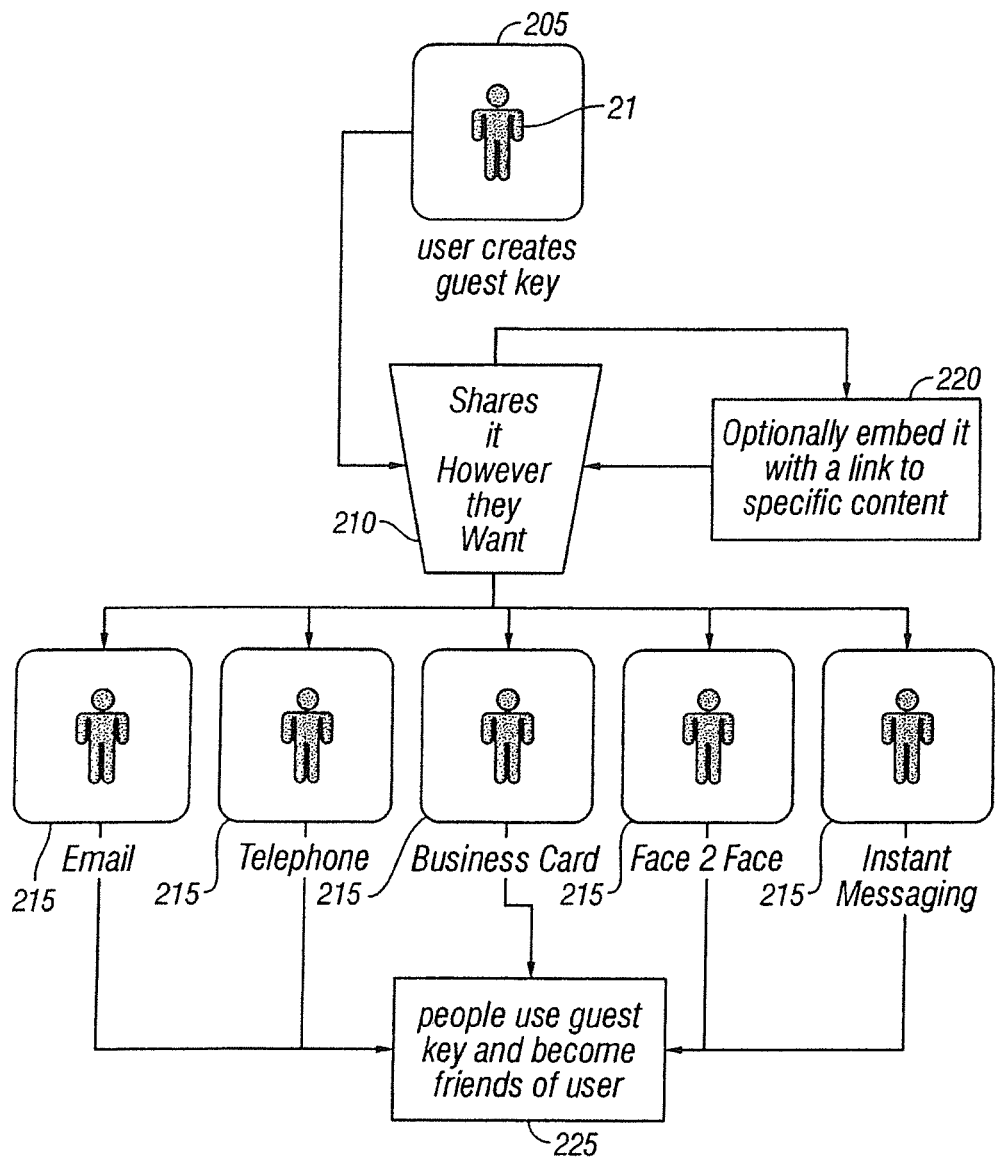
FIG. 2 is flow chart depicting how a user might disseminate his or her guest key in order to expand his or her network proactively, in accordance with the present invention.

Referring to FIG. 2, there is generally shown the high level flow by which a user 2.1 may disseminate his or her guest key in order to expand his or her network proactively using the GKSS 1.3. A user 2.1 also may be considered a member 2.1, in which the user has joined the affinity network system. A preferred example of this flow involves the user creating a guest key (205) and then the user may share his/her guest key in any desired manner (210). The user may use one or more of a plurality of modes (215) to share his/her guest key with one or more viewers (i.e. guests). The user may, for example, identify his/her guest key electronically, such as by e-mail or instant messaging, by voice over a over the telephone or a face to face meeting or discussion, by printed communication, such as on a on a business card, etc. If the user chooses to share his/her guest key using an electronic mechanism such as, for example, via electronic mail, instant message, chat, etc., the GKSS 1.3 enables the user to optionally embed the guest key with a link to specific content. The specific content may be any content desired by the user to be accessed by the guests. The guests may use the user's guest key to become associated as friends of the user and access the specific content (225).

Figure 3:
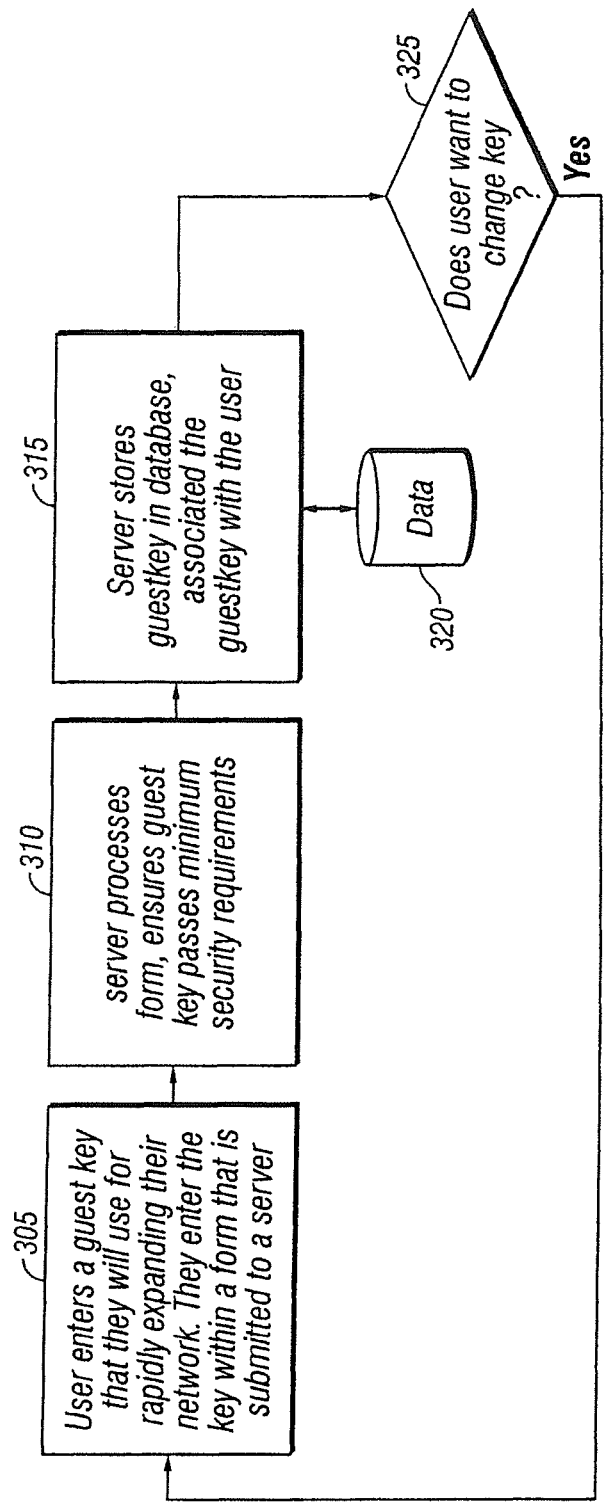
FIG. 3 is a flow chart illustrating how a user can set and change his or her guest key in accordance with the present invention.

Referring to FIG. 3, there is generally shown the high level flow by which a user 2.1 may set and change his/her guest key in accordance with one embodiment of the present invention. First, a user enters a guest key that he/she uses for expanding their network (illustrated with reference number 305). According to one embodiment, the guest key may be entered within a form that is submitted to a server although other manners of entering the guest key may be used. A server processes the form and determines whether the guest key passes minimum security requirements (illustrated with reference number 310). The server stores the guest key in a database 320 and associates the guest key with the user (illustrated with reference number 315). Later, or immediately thereafter, the user 2.1 is provide an option of changing the guest key selected (325). If yes, the user may enter the new guest key (305).

Figure 4:
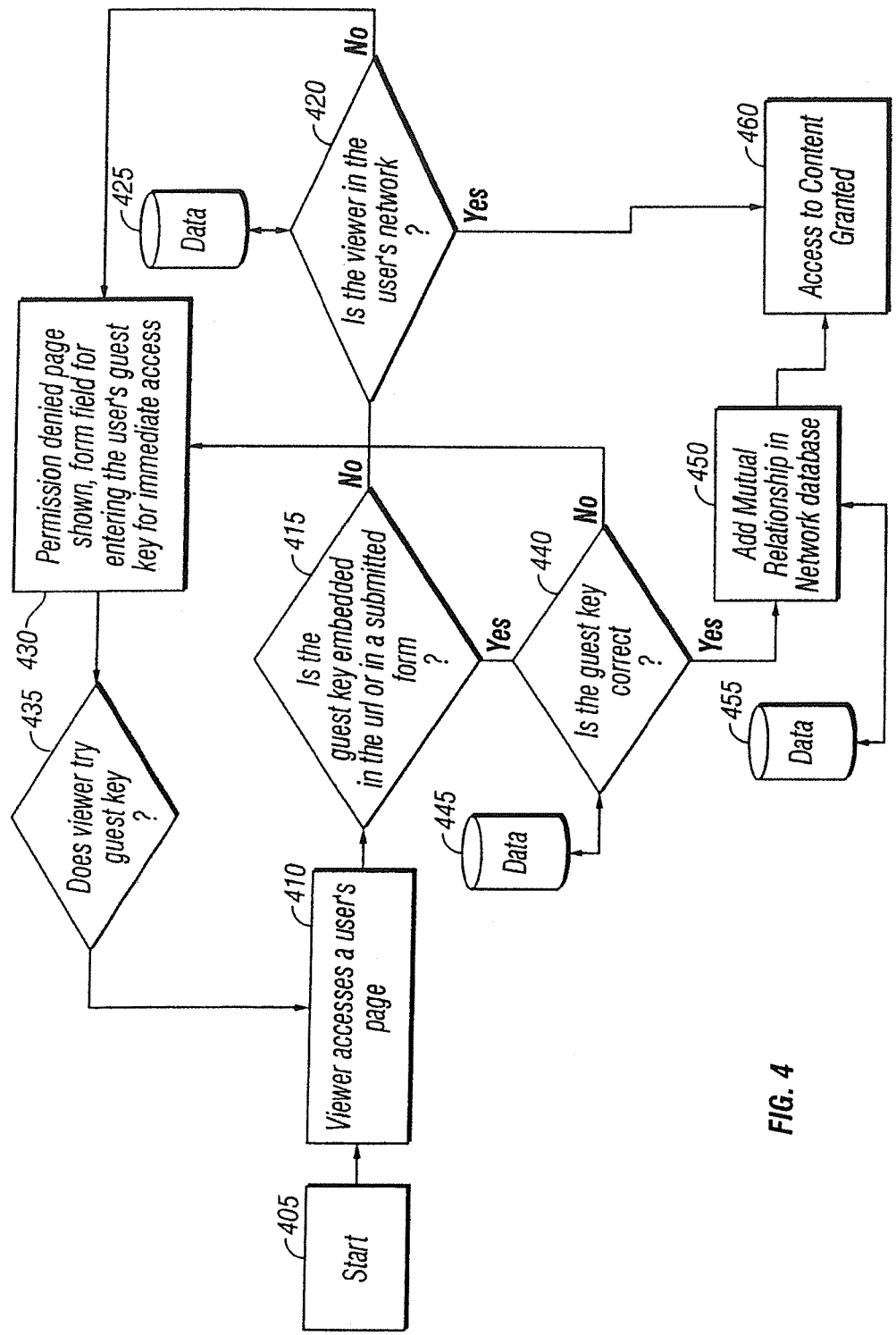
FIG. 4 is a flow chart illustrating how a Guest Key can be used in accordance with the present invention.

Referring to FIG. 4, there is generally shown a high level flow by which a Guest Key is used to access a member's content and associate a guest (i.e. viewer become friends with that member. The flow may start as illustrated with reference number 405. A viewer may access a user's web page (illustrated with reference number 410) using any know mechanism for accessing web pages such as, for example, a web browser. The viewer may access the user's web page using a guest key created by the user and provided to the viewer by the user. A determination is made regarding whether the guest key has been submitted, such as whether the guest key is embedded in a uniform resource locator (URL) or in a form submitted (415). If a determination is made that the viewer has not submitted the guest key, a determination is made regarding whether the viewer is in the user's network already (420). In an illustrated embodiment, a database 425 optionally is accessed to assist in this determination.

Figure 7:
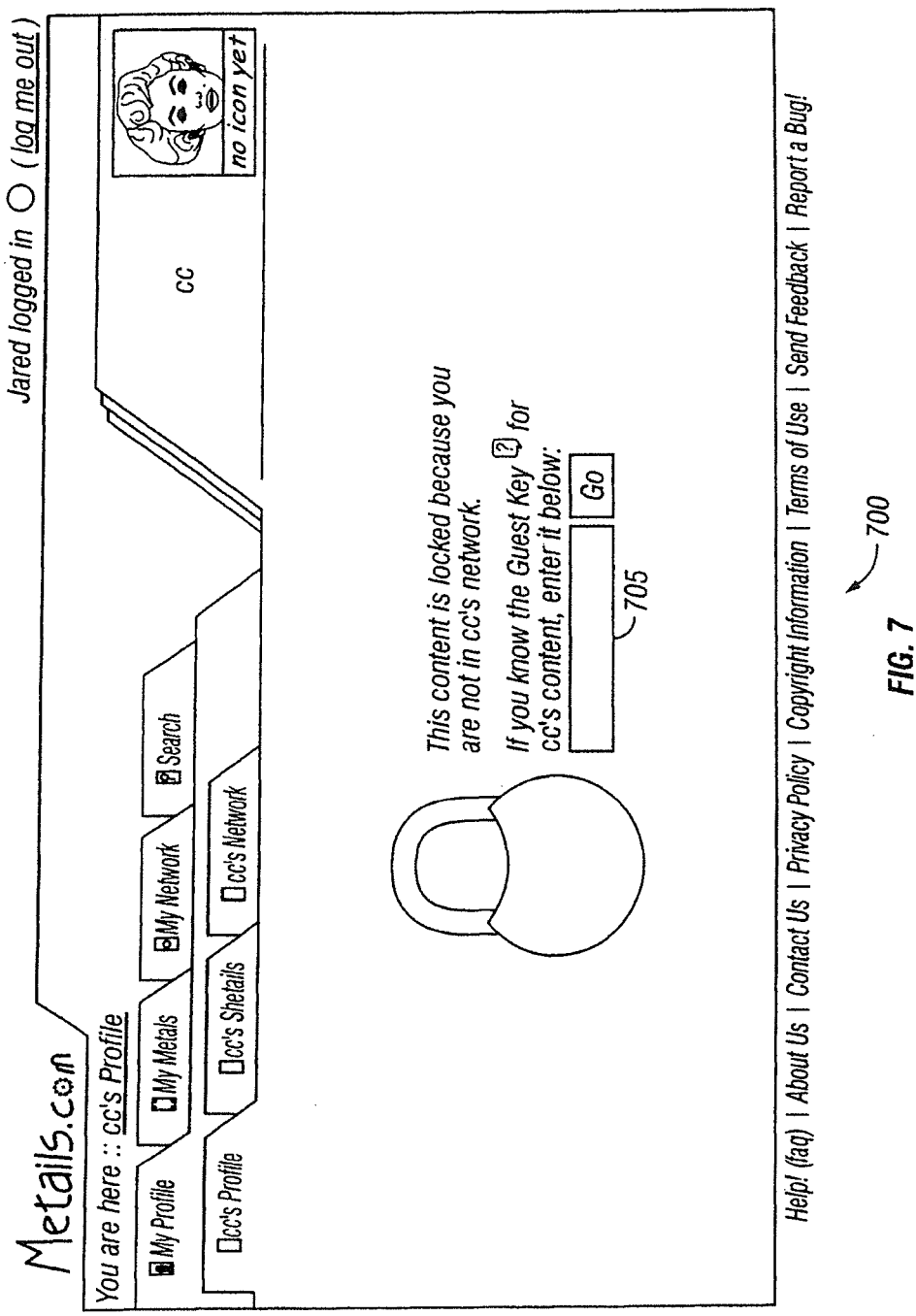
FIG. 7 is an illustration of an exemplary viewer display of what a user's content may look like to someone who is not in the user's network and who does not possess that user's guest key, in accordance with the present invention; and, FIG. 8 is an illustration of an exemplary viewer display after successful use of a guest key to become a user's friend, in accordance with the present invention.

If the viewer is not already in the user's network, and a guest key is not provided, the viewer is notified that access has been denied, such as via a permission denied page (as illustrated in FIG. 7) that optionally includes a form field in which the viewer may enter a guest key to enable access to the user's web page (430). A determination is made regarding whether the viewer has entered a guest key (435). If the viewer has entered a guest key, the system may enable the viewer to access the user's web page (410), or optionally proceed to other processing steps, such as determination whether the guest key submitted is correct 440. Otherwise, the viewer may not be permitted to access the user's web page.

In instances where a viewer has submitted a guest key such as for example embedded in a URL or in a submitted form, a determination is made regarding whether the guest key is correct (440). This determination may be made by accessing a database 445 that maintains a database of users and corresponding guest keys. A check is made regarding whether the guest key entered by the viewer matches a guest key for the user. If the guest key is not correct, a permission denied page may be shown as described above (430).

If, however, the guest key entered is correct, a mutual relationship may be added in a network database (450). An exemplary database is illustrated with reference number 455. The mutual relationship may be used to associate the viewer with the user whose guest key the viewer used to access the user's web page. The viewer may then be granted access to the user's content (460), such as product information, friendship affiliations, etc.

Similarly, if a determination is made that the viewer is in the user's network (in step 420), the viewer may be granted access to the user's content. Inherently in this embodiment, an affinity network database is constructed proactively by registering a first user via a registration process (this first user is the "viewer" described in reference to FIG. 4). In the registration process the first user selects a guest key associated with the first user during the registration process. This same user can seek access to other users' content. In this example, the server system can receive a request from this first user (now acting as a "viewer") to access another user's content (i.e. 410). The system determines whether the first user is permitted access to the second user's content, such as by accessing the affiliation database 425 (or 455). If yes, access is granted and the second user's content is presented to the first user.

Figure 5:
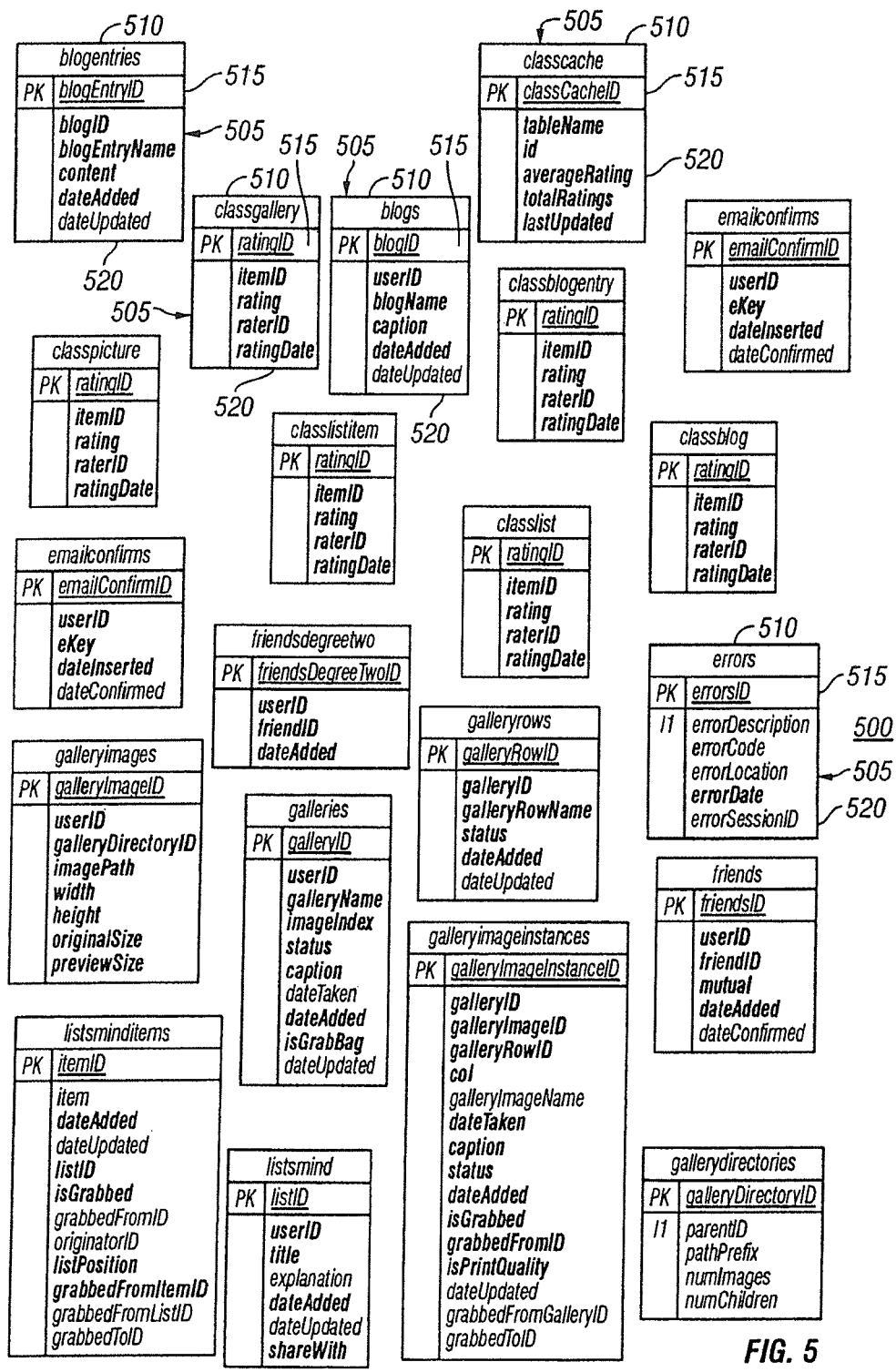
FIGS. 5 and 6 illustrate database schema in accordance with a preferred embodiment of the invention (which the referenced program listing interacts with)
Figure 6:
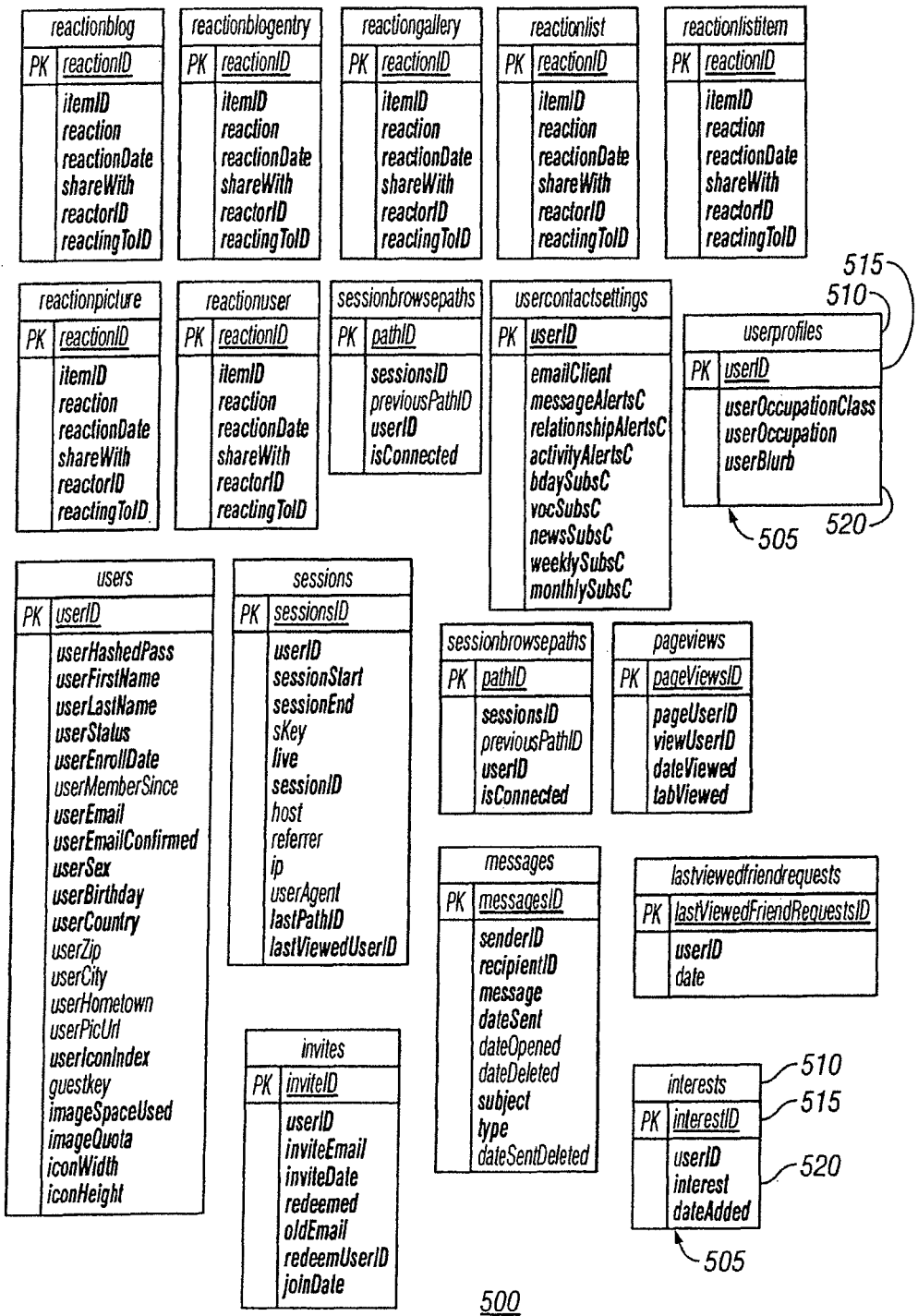

FIGS. 5 and 6 illustrate database schema 500 for a plurality of data objects 505. The data objects 505 may include objects relating to, for example, blog entries, blogs, class gallery, class cache, class blog entry, class picture, class list item, class list, class blog, electronic mail confirmations, friends, second degree friends, gallery rows, gallery images, galleries, gallery image instances, gallery directories, errors, lists mind, list mind items, reaction blogs, reaction blog entry, reaction gallery, reaction list, reaction list item, reaction picture, reaction user, session browse paths, sessions, user contact settings, user profiles, users, page views, messages, invites, interests, and last viewed friend requests.

Each data object 505 may include a data object name 510, data object identifier 515, and data object information 520. The data object name 510 may be a name assigned by a programmer, administrator or other user of a system for constructing a networking database and system proactively. The data object identifier 515 may be an identifier that is used by the system for retrieving that data object. The data object information 520 may include information relating to that data object 505. For example, an errors data object 505 may include a data object name 510 titled errors. The data object identifier 515 may be titled errorsID. The data object information 520 may be information relating to errors encountered while the system is being used. For example, the data object information 520 for an errors data object 505 may include an error description, code, location, date, and sessionID. This information assists a programmer, administrator or other user in determining how to correct the error.

FIG. 7 is an illustration of a permission denied page 700 that includes a guest key form field 705 according to one embodiment of the invention. As discussed above with reference to FIG. 4, if a determination is made that a guest key has not been submitted or the viewer is not in the user's network, the permission denied page 700 may be presented to the viewer. The permission denied page 700, however, may include the guest key form field 705 that enables the viewer to enter a guest key for that particular user's web page. Upon entering a correct guest key for that user, the viewer may be presented with the user's web page.

Figure 8:
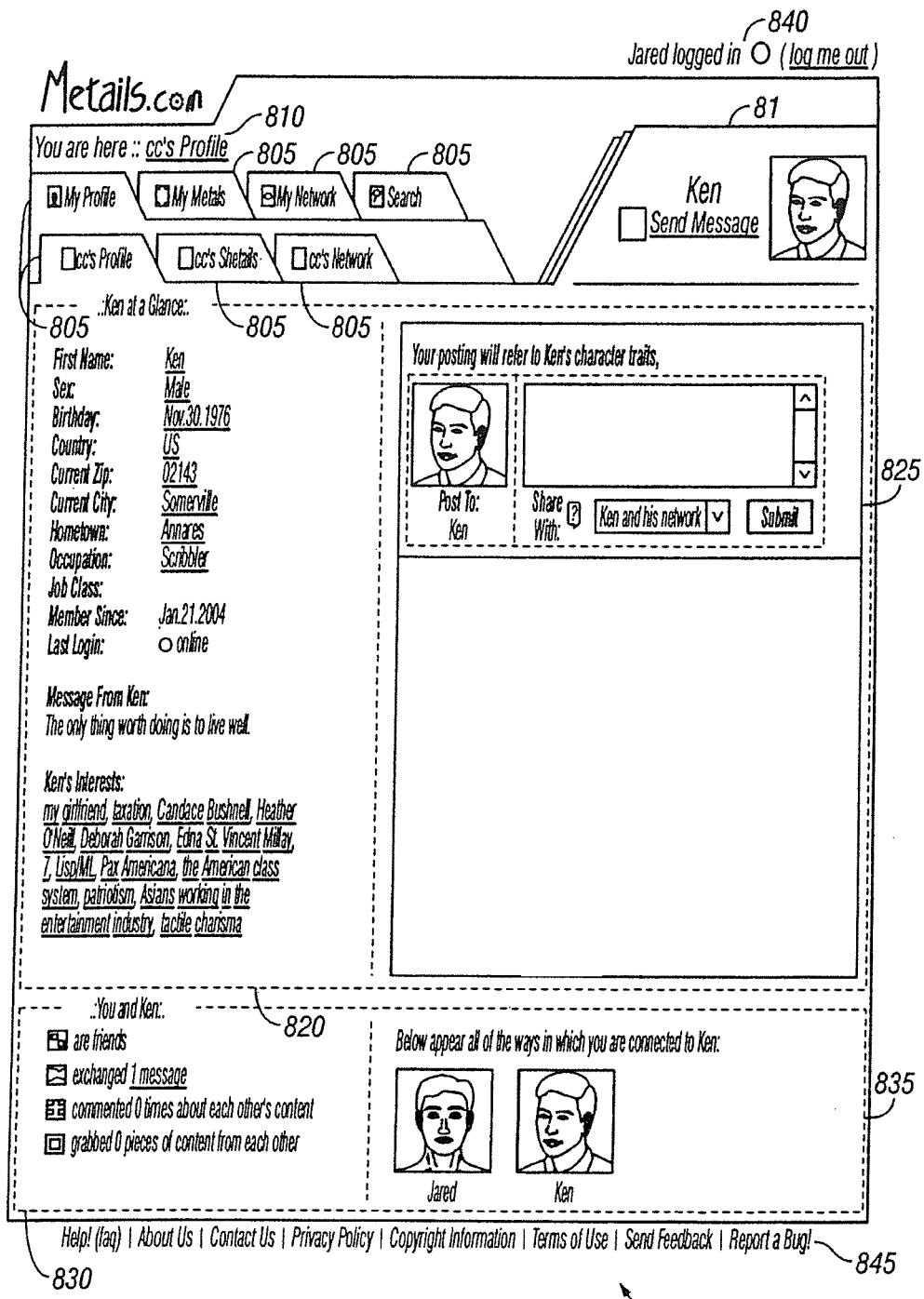

FIG. 8 is an exemplary illustration of a user's content, presented in one of the possible formats, namely a web page 800 that may be presented to a viewer upon entering a valid guest key according to one embodiment of the invention. The web page 800 may include one or more selectable tabs 805 that, when selected, present different information and/or options to a viewer. The tabs 805 may be selected using, for example, a convention keyboard, mouse, touch-screen, voice recognition software, etc. The web page 800 may also include a web page identifier 810 that identifies which web page or portion of a web page the viewer is viewing.

The web page 800 may include an information section 820 that provides information that corresponds to the tab 805 selected. For example, if a user profile tab is selected, the information section 820 may include biographical information pertaining to the user. The biographical information may include information such as first name, birthday, hometown, current residence, gender, etc. Additional information may also be included such as interests and messages posted by the user. Any other type of information may also be presented.

A message field 825 may also be included in the web page 800. The message field 825 enables the viewer to post a message to the user whose web page the viewer is viewing. The message field 825 may enable the viewer to share the message with only the user, the user and his network or possibly other options.

The web page 800 may also include a status field 830. The status field 830 may indicate a type of relationship between the viewer and the user, number of messages exchanged between the viewer and the user, number of times the viewer and user commented about each other's content, number of pieces of content grabbed from each other, etc.

An association field 835 may also be presented in the web page 800. The association field 835 may indicate each manner in which the viewer and user are associated. For example, the association field 835 may include images of common friends that the viewer and user have.

A connection field 840 may be provided to indicate whether the viewer is logged-in. If the viewer is logged-in, the connection field 840 may include a log-out option. If the viewer is not logged-in, the connection field 840 may include a log-in option.

A links field 845 may also be included in the web page 800. The links field 845 may include links to other pages on the web site that hosts the user's web page. For example, links may be provided to one or more of the following web pages:

frequently asked questions, help, terms of use, about us, copyright information, send feedback, report a bug, etc.

Thus, it is seen that a method and apparatus for constructing a networking database and system proactively is provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A machine-readable medium having instructions stored thereon executable by the machine, the instructions comprising:
    using a computer to record a guest key created by a content owner on a social network;
    storing originated content with the social network, the originated content including content that is provided by the content owner;
    receiving the guest key from a social network user who is not the content owner;
    allowing the social network user to access the originated content provided that one or more permissioning criteria are met, the permissioning criteria including:
    that the guest key entered is the correct guest key for access to the originated content; or the social network user has a preexisting relationship established in the social network with the content owner;
    wherein the content owner disseminates the guest key to at least one social network user independent of the social network;
    when each social network user inputs the correct guest key to access the content owner's originated content, a relationship between each social network user and the content owner is established with the social network;
    the originated content may be accessed by each social network user who inputs the correct guest key; and
    wherein the guest key is independent of a password required for the content originator to login to the content originator's account with the social network.

2. The machine-readable medium of claim 1, wherein the content owner disseminates the guest key by at least one of the following: electronically, including email; orally; telephonically, including via text message; by instant message, and by paper.

3. The machine-readable medium of claim 1, wherein the content owner may change the guest key.

4. A machine-readable medium having instructions stored thereon executable by the machine, the instructions comprising:
    using a computer to record a guest key created by a content owner on a social network;
    storing permissioned content with the social network, the permissioned content including content that is provided by the content owner;
    receiving the guest key from a social network user who is not the content owner;
    allowing the social network user to access the permissioned content provided that one or more permissioning criteria are met, the permissioning criteria including:
    that the guest key entered is the correct guest key for access to the permissioned content; or
    the social network user has a preexisting relationship established in the social network with the content owner; wherein,
    the content owner disseminates the guest key to at least one social network user independent of the social network;
    when each social network user inputs the correct guest key to access the content owner's permissioned content, a relationship between each social network user and the content owner is established with the social network;
    the permissioned content may be accessed by each social network user who inputs the correct guest key; and
    wherein the guest key is independent of a password required for the content owner to login to the content owner's account with the social network.

5. The machine-readable medium of claim 4, wherein the permissioned content comprises at least one of files uploaded from a local computer to the social network and information input into the social network with a computer input device.

6. The machine-readable medium of claim 4, wherein a plurality of social network users are able to access the content owner's content using the same guest key.

7. A method of constructing an affinity network database proactively comprising:
    recording a guest key created by a user;
    providing a viewer with the guest key by a sharing action performed by the user independent of the affinity network;
    receiving a request from the viewer to access the user's content, wherein the user is a member of the affinity network;
    determining whether the viewer is permitted access to content associated with the user by determining if the viewer is a member of an authorized affinity group associated with the user, or alternatively determining if the viewer has provided the guest key if the viewer is not a member of the affinity network;
    establishing a relationship between the viewer and the user within the affinity network when the viewer inputs the correct guest key to access the user's content; and
    providing the viewer with access to content input by the user if a determination is made that the viewer is permitted access to the content.

8. The method of claim 7, wherein the recording the user-selected guest key includes providing a new-user sign-up form to the user upon registration in the affinity network, the form including an option for the user to specify a guest key.

9. The method of claim 7 wherein recording the user-selected guest key includes providing a guest key form in which the user enters a new user-specific guest key, the guest key form usable for changing the guest key from a first user-specific guest key to a new user-specific guest key.

10. The method of claim 7, further comprising assigning the viewer to a group.

11. A method of constructing an affinity network database comprising:
    registering a first user via a registration process;
    providing a guest key selection form by which the first user can specify a user-specific and user-specified guest key during the registration process, wherein the guest key is usable by other persons to access content of the first user;
    receiving a request from a viewer to access content associated with the first user;
    providing the viewer with the guest key independent of the affinity network;
    determining that the viewer is not a member of an authorized group associated with the first user and determining whether the viewer has provided the user-specific guest key;

establishing a mutual relationship between the viewer and the user within the affinity network when the viewer inputs the correct guest key to access the user's content; and displaying the content associated with the first user and establishing a relationship between the user and viewer if it is determined that the viewer has provided the user-specific guest key.

12. The method of claim 11, further comprising assigning the viewer to a group associated with the first user.

13. The method of claim 11, further comprising creating an affinity network of friends of the first user based on the guest key.

14. The method of claim 13, further comprising monitoring the network of friends.

15. A system of constructing an affinity network database proactively comprising:

a registering module that registers a first user via a registration process;

a selecting module that provides an option to the first user to designate or input a guest key associated with the first user during the registration process, wherein the guest key is used by other persons to access content of the first user and provided to other persons independent of the affinity network;

a receiving module that receives a request from the second user to access to the first user's content;

an access determining module that determines whether the second user is permitted access to the first user's content; and a data module that stores the first user's content, access to the data module being provided to the second user and a mutual relationship is established between the second user and the first user within the affinity network if the second user inputs the correct guest key and a determination is made that the second user is permitted access to the content.

16. The system of claim 15, further comprising an enabling module that enables the second user to preview the first user's content.

17. The system of claim 15, further comprising a group determining module that determines if the second user is a member of a group permitted access to the first user's content.

* * * * *